UNITED STATES PATENT OFFICE.

LEE ROUSH, OF BEAVER, PENNSYLVANIA.

PREPARATION OF YEAST.

1,271,371. Specification of Letters Patent. Patented July 2, 1918.

No Drawing. Application filed April 5, 1917. Serial No. 160,048.

*To all whom it may concern:*

Be it known that I, LEE ROUSH, residing at Beaver, in the county of Beaver and State of Pennsylvania, a citizen of the United States, have invented or discovered certain new and useful Improvements in the Preparation of Yeast, of which improvements the following is a specification.

My invention relates to improvements in the preparation of compressed yeast of commerce for bread-making. In compressed yeast, as it is bought and sold, the yeast cells are dormant and enfeebled, and, in order to render the yeast more effective in bread-making, it is common practice to introduce the compressed yeast (ordinarily softened in water) in a watery preparation of sugar-containing material, commonly spoken of as "yeast food," in which the enfeebled yeast cells shall revive, and the growth be invigorated. When this is accomplished, the active culture of yeast is ready for use in preparing the bread dough.

My invention relates particularly to this reviving of the enfeebled life of compressed yeast. The informing idea of my invention consists in introducing into the yeast food, after the compressed yeast has been introduced into it, and at the bottom of the watery mass, air in minutely divided bubbles. In consequence of the introduction of the air, I am able at once to stimulate and hasten the reviving of yeast growth, and, incidentally, to modify to advantage the composition of the yeast food, and also to effect saving in the amount of compressed yeast required to raise a given quantity of bread dough.

Following my invention in its preferred form, I employ one pound of compressed yeast for each barrel of flour used in bread making for five-hour stage dough. I prepare a yeast food, and this food may be compounded with a great deal of latitude in composition. As a suitable food I give typically the following: I make a mash containing these ingredients in substantially the quantities named: malt flour, 4 ounces; malt sprouts, 3 ounces; and flour, 6 ounces. These ingredients I mix and make into a mash in about 4 pounds of water, and bring the mixture to a temperature of 118°–122° F. and maintain it at that temperature for about 2 hours. The mash in such treatment becomes a wort. To the wort so prepared I add the pound of compressed yeast, previously softened in water. I allow the mixture, with the yeast introduced in it, then to stand at a temperature of 80°–82° F. While it is so standing, I aerate the mixture, and, at the end of an hour, it is ready for use in the preparation of the bread dough.

The aeration requires more particular description. It is old in yeast-preparing operations (though not in this specific connection, in the revival of compressed yeast) to cause air to bubble through the mass in which yeast development is going on; but in this earlier use, the air is injected through nozzles consisting of perforated plates ordinarily of metal; the air bubbles are relatively large, and because they are relatively large they rise rapidly to the surface of the mass, and are relatively ineffective. I employ a gas nozzle of which the air delivering portion consists of a porous body; for example, a plate of sandstone half an inch thick. I use sufficient pressure upon the injected air to cause it to pass through the porous plate in sufficient volume; for example, using a plate of sandstone half an inch thick, in a mass of material of the volume indicated, I find it good practice to cause the air to pass through under an impelling pressure which may be increased as may be necessary to 4 pounds to the square inch. I have spoken of a sandstone plate; any substantially equivalent porous material of suitable shape and thickness may be employed, whether natural or artificial, the end in view being to deliver the air into the mass of yeast food in minutely divided condition. Porous materials are common in the useful arts, and when in the ensuing claims I speak of the air oozing into the wort, I mean to designate and define such passage of air in minute bubbles of indefinite number which takes place through a sandstone plate, for example, as distinguished from the percolation of air from a definite number of orifices of determined, and relatively large size, which, as I have said is elsewhere employed in yeast production. The air which in the practice of my invention oozes through the stone or other porous plate is so minutely divided that it rises slowly in the thick but watery mass of wort, and the growing yeast plant is enabled to seize upon and absorb it, as and to an extent which otherwise it could not do.

Normally the yeast in its growth feeds upon sugar (and mineral salts). It breaks the sugar down, absorbs the needful oxygen, and produces, as by-products (so to speak) of its own growth, alcohol and carbon dioxid. When air is present, introduced as I introduce it, oozing in minute globules, the growing yeast requires the less sugar—or even none at all. It is because the air is so finely divided and moves so slowly upward through the mass that the yeast is able to take it up in adequate quantities.

In view of what is just said, it is apparent that the yeast food, a typical composition for which is given above, may be considerably varied in its composition. Since sugar is not needful, the flour ingredient may be left out, or modified in character or in amount, and the other ingredients too may be modified; the essentials of the food being protein broken up in peptones and amino bodies.

The porous body through which air oozes into the mass will preferably be arranged at or substantially at the bottom of the container in which the yeast culture is being conducted.

I have in the foregoing description given a typical procedure; it will be understood that the operation includes variable elements. A decrease in the amount of compressed yeast taken, and a corresponding increase in the amount of yeast food taken, will in an increased length of time produce the same amount of active yeast for introduction into the bread-dough; on the other hand, an increase in the amount of compressed yeast (which permits of a decrease in the amount of yeast food) will give the same practical result in diminished time.

I have found by observation that in the culture of the yeast the free oxygen made available in my process to the growth of the yeast plant is vastly more effective in stimulating growth than the oxygen present in the yeast food of the usual practice, and which the plant has first to liberate before it can absorb it.

I claim as my invention:

1. The herein described method of stimulating the development of yeast in a fluid culture mass which consists in causing air to ooze through a porous body into the mass while the growth of yeast is in progress therein.

2. The method herein described of reviving compressed yeast which consists in preparing a wort of malt flour, malt sprouts, and flour, introducing compressed yeast into the wort when prepared, and causing air to ooze into the yeast-containing wort.

3. The method herein described of reviving compressed yeast which consists in forming a mash of malt flour, malt sprouts, and flour, combined in proportions of substantially 4:3:6, maintaining the mash when prepared for two hours at a temperature of 118°–122° F., then introducing compressed yeast to the wort so produced and allowing the yeast-containing wort to stand at a temperature of 80°–82° F., and, as it stands, causing air to ooze into it.

4. The method herein described of reviving compressed yeast which consists in preparing a culture mass of yeast food, introducing compressed yeast into the mass, and causing air to ooze into the yeast-containing mass.

5. The method herein described of reviving compressed yeast which consists in preparing a wort of malt flour, malt sprouts, and flour wherein the quantity of malt flour is not more than about fifty per cent. of the three named ingredients, introducing compressed yeast into the wort when prepared, and causing air to ooze through a porous body into the yeast-containing wort.

6. The method herein described of reviving compressed yeast, which consists in mixing with compressed yeast a mass of yeast food, and causing air to ooze through a porous body into the yeast-containing mass.

In testimony whereof I have hereunto set my hand.

LEE ROUSH.

Witnesses:
BAYARD H. CHRISTY,
FRANCIS J. TOMASSON.